Figure 2:
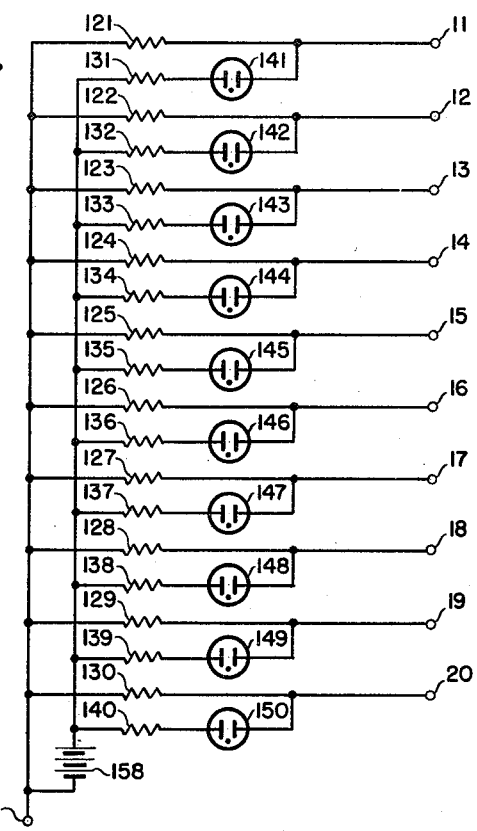

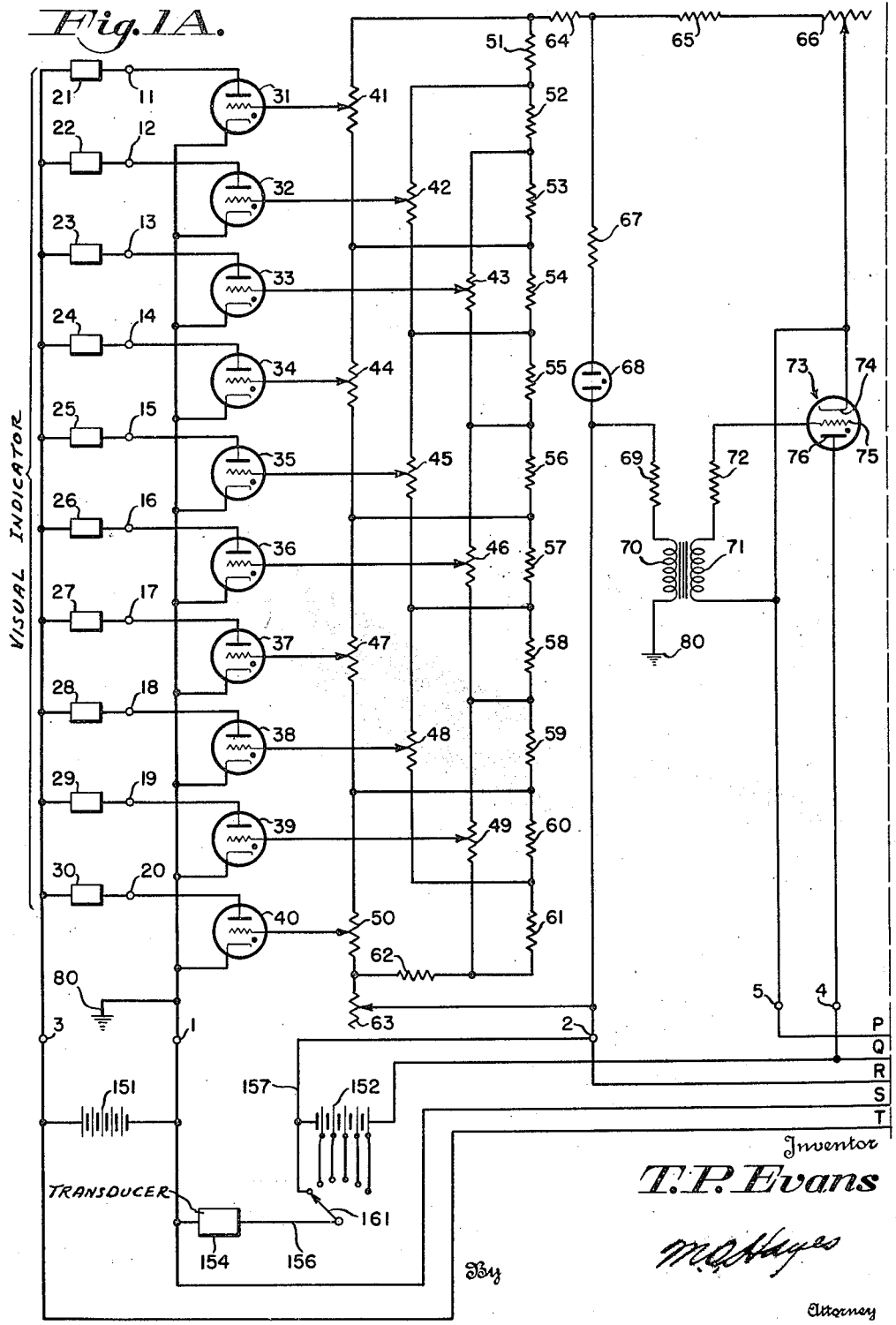

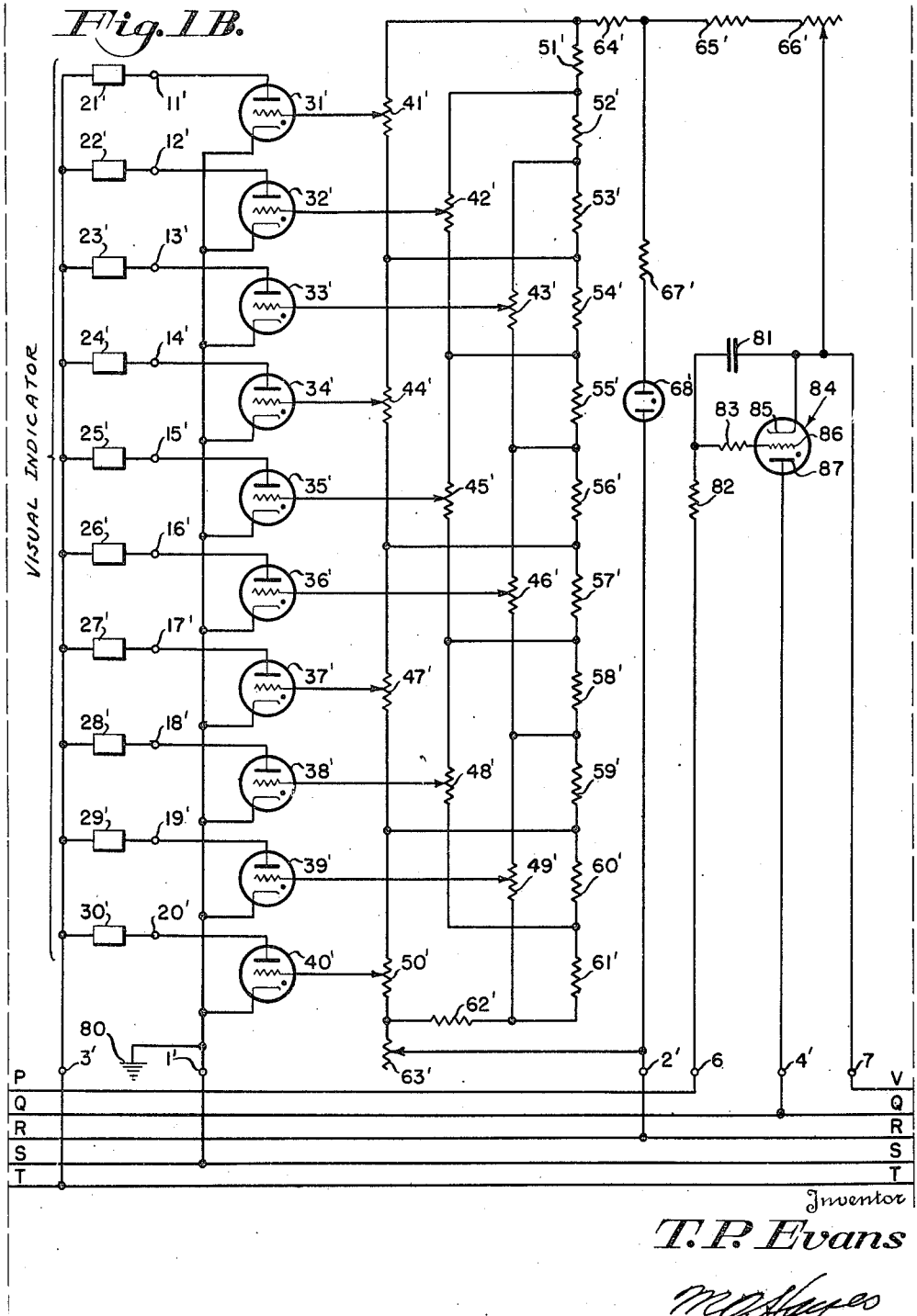

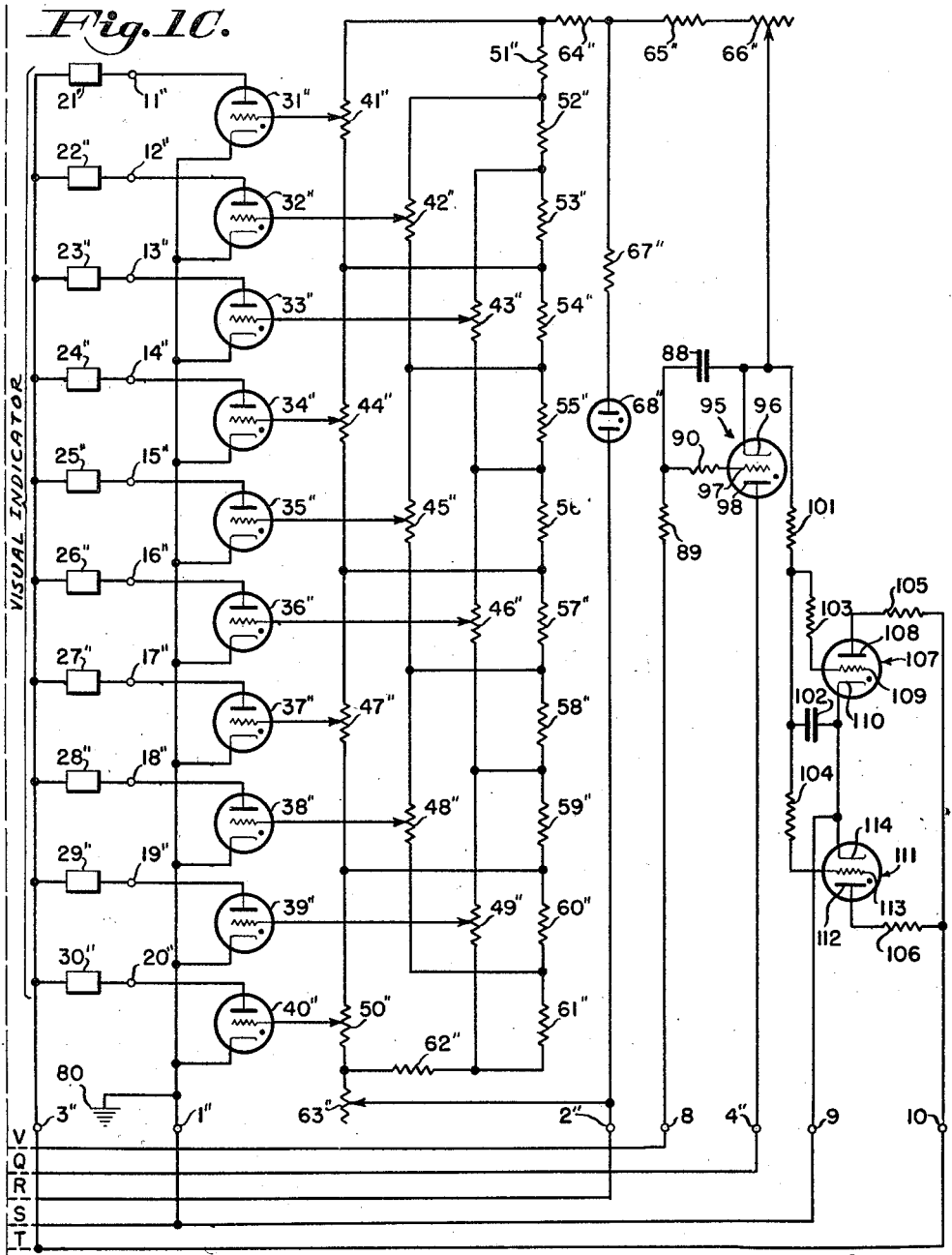

Dec. 24, 1957   T. P. EVANS   2,817,815
TRANSIENT SIGNAL RECORDER
Filed Feb. 2, 1948   4 Sheets-Sheet 4

Inventor
T. P. Evans
By M. C. Hayes
Attorney

United States Patent Office 2,817,815
Patented Dec. 24, 1957

2,817,815

TRANSIENT SIGNAL RECORDER

Thomas P. Evans, New Haven, Conn.

Application February 2, 1948, Serial No. 5,706

17 Claims. (Cl. 324—77)

(Granted under Title 35, U. S. Code (1952), sec. 266)

This invention relates to electronic measuring and recording apparatus, and more particularly to apparatus for measuring and recording the characteristics including the shape, duration, and amplitude, of a transient electrical signal.

In accordance with a preferred embodiment of the invention, a plurality of normally inactive banks of normally nonconducting gaseous electron discharge tubes are provided, each of the banks having a predetermined number of measuring tubes, for example, ten, and each of the banks also having a firing control tube associated therewith for rendering the banks active. A number of the measuring tubes are fired or rendered conducting selectively in accordance with the instantaneous value of the signal voltage applied to the bank at the moment the bank becomes activated. The signal voltage is simultaneously applied to all banks, but the banks are sequentially energized at predetermined spaced time intervals in accordance with the time constants of the circuits of the firing control tubes associated therewith. Each of the measuring gaseous discharge tubes has associated therewith, preferably in the anode circuit thereof, an electroresponsive device for indicating whether the tube has fired. Accordingly, apparatus is provided in which the number of tubes which are fired or rendered conducting in the banks provide indications of the relative magnitude of the signal at the instants of operation of the respective banks. By suitable calibration, as hereinafter described in greater detail, the apparatus may provide a measure of the absolute value of the signal. The aforementioned electroresponsive devices may be indicating devices, such as neon glow tubes, or recording control devices, such as relays, or the like.

The apparatus of the instant invention is particularly well adapted to measure and record the force wave generated by an underwater explosion.

One of the objects is the provision of new and improved apparatus for measuring and recording the characteristics including the amplitude, duration, and shape, of a transient electrical signal.

Another object is to provide new and improved apparatus suitable for measuring and recording the force wave generated by an explosion.

A further object resides in the provision of new and improved measuring and recording apparatus in which a plurality of normally inactive banks each comprising a plurality of electron discharge tubes are provided, the banks being operated at intervals in successive spaced time relationship during the duration of the signal, the tubes in each bank being selectively fired or rendered conducting in accordance with the instantaneous magnitude of the signal at the moment the bank is activated.

Figure 3:
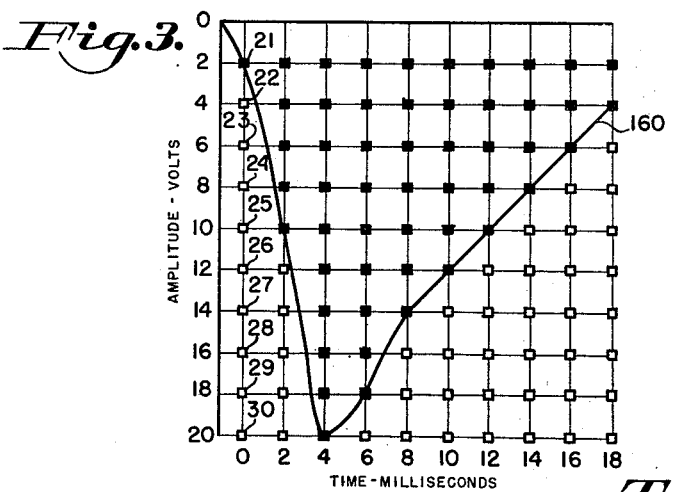

Other objects not specifically set forth hereinbefore will be apparent after a consideration of the following specification taken in connection with the accompanying drawings, in which:

Figs. 1A, 1B, and 1C taken together are a diagram of a complete electrical system according to the preferred embodiment of the invention;

Fig. 2 is a circuit diagram of a suitable calibrating circuit for use with the apparatus of Figs. 1A, 1B, and 1C; and Fig. 3 is a diagram of a typical indication of a signal which might be obtained on an embodiment employing ten banks of ten gaseous discharge tubes each.

Referring now to the drawings, in which like reference numerals are employed throughout to designate like parts, and in particular to Figs. 1A, 1B, and 1C thereof, there is shown thereon a plurality of banks of gaseous electron discharge tubes 31—40, 31'—40' and 31" to 40", each group inclusive, which may be similar triodes and of any convenient type. The cathodes of all the tubes are connected together and to terminals 1, 1' and 1" which are grounded at 80. The anodes of the tubes 31—40, 31'—40' and 31"—40" are connected to terminals 11—20, 11'—20' and 11"—20", respectively.

To these terminals 11—20, 11'—20' and 11"—20" are also connected one lead connection of each of ten electroresponsive devices 21—30, 21'—30' and 21"—30" respectively, all the electroresponsive devices having their other lead connections connected together and to terminals 3, 3' and 3". These electroresponsive devices may be relays or neon glow tubes having resistors in parallel therewith, the devices being adapted to be operated by the anode currents of the respective gaseous electron discharge tubes when these tubes are selectively fired or rendered conducting in a manner to be subsequently described, or may be fuses which are adapted to blow in response to the aforementioned anode currents and thereby provide means forming permanent indications or records of the tubes fired.

The gaseous electron discharge tubes of the banks are referred to herein as the measuring discharge tubes, to distinguish them from other firing control gaseous electron discharge tubes which are employed to control the operation of the banks, each bank having one control tube associated therewith, this tube being designated in Fig. 1A by the reference numeral 73 and having cathode 74, control grid 75, and anode 76.

Between the cathode 74 and control grid 75 of tube 73 is connected the secondary 71 of a signal input transformer having primary 70, the secondary having connected in series therewith a current limiting resistor 72. The primary 70 has one end thereof grounded at 80, the other end being connected by way of resistor 69 to terminal 2. Terminal 2 has connected thereto by lead 157 the negative terminal of a plate or anode supply battery 152 which may be of the order of 180 volts, the positive terminal of battery 152 being connected to terminal 4, which is also connected to anode 76.

Between the cathode 74 and terminal 2 is connected a resistor network comprising, in series in the order named, variable resistor 66, fixed resistors 65, 64, 51, 52, 53, 54, 55, 56, 57, 58, 59, 60, 61 and 62 and variable resistor 63. This network provides a voltage divider arrangement substantially the whole potential of battery 152, except for the voltage drop in tube 73, being applied across the aforementioned network when tube 73 is fired and rendered conducting in a manner to be subsequently described.

An additional voltage divider network comprising in series potentiometers 41, 44, 47, and 50 is connected at one end thereof to the junction between resistors 64 and 51 and at the other end thereof to the junction between resistors 62 and 63. The arms of potentiometers 41, 44, 47, and 50 are connected to the control grids of tubes 31, 34, 37, and 40 respectively.

A further voltage divider network comprises in series potentiometers 42, 45, and 48, this network having one end connected to the junction between resistors 51 and 52, and the other end of the network connected to the junction between resistors 60 and 61. The arms of potentiometers 42, 45, and 48 are connected to the control grids of tubes 32, 35, and 38 respectively.

A still further voltage divider network comprises in series potentiometers 43, 46, and 49, one end of this last-named voltage divider network being connected to the junction between resistors 52 and 53, the other end of the last-named network being connected to the junction between resistors 61 and 62, the arms of potentiometers 43, 46, and 49 being connected to the control grids of tubes 33, 36, and 39 respectively.

The junction between potentiometers 41 and 44 is connected to the junction between resistors 53 and 54; the junction between potentiometers 42 and 45 is connected to the junction between resistors 54 and 55; the junction between potentiometers 43 and 46 is connected to the junction between resistors 55 and 56; the junction between potentiometers 44 and 47 is connected to the junction between resistors 56 and 57; the junction between potentiometers 45 and 48 is connected to the junction between resistors 57 and 58; the junction between potentiometers 46 and 49 is connected to the junction between resistors 58 and 59; and the junction between potentiometers 47 and 50 is connected to the junction between resistors 59 and 60.

The aforementioned voltage divider networks with their respective connections to the control grids of tubes 31–40 inclusive provide means for biasing the tubes at different graduated potentials. Terminal 2 is connected to ground 80 by way of lead 157, switch 161, lead 156, and signal source or variable impedance 154, thereby completing the cathode-grid circuits of tubes 31–40 inclusive. When firing control tube 73 is conducting, the grids of tubes 31–40 have positive biasing potentials applied thereto, the grid of tube 31 having the greatest positive bias, and the grid of tube 40 the least positive bias.

Potentiometers 41–50 inclusive provide means for adjusting the bias voltages on the grids of the respective tubes within small limits.

Battery 151, which may supply a potential of the order of 135 volts, is connected between terminals 1 and 3 and supplies a positive potential to the anodes of tubes 31–40 inclusive.

Connected to the junction between resistors 64 and 65 is a resistor 67 having a neon glow tube 68 connected to the other end thereof, the other terminal of neon discharge tube 68 being connected to terminal 2.

The circuit of the first bank of gaseous measuring electron discharge tubes of Fig. 1A and its associated firing control tube has been traced. The operation of this portion of the electrical system will best be understood with reference to a specific example.

Assume for example that it is desired to employ the apparatus of the invention to record the force wave generated by an underwater explosion.

Variable impedance 154 may be a signal transducer of the type in which the impedance increases with an increase in pressure applied thereto such, for example, as the electromagnetic acoustic transducer disclosed in an application by Joseph F. Keithley et al. for Method and Apparatus for Measuring and analyzing Transient Pressures in a Body of Water, Serial No. 480,576, filed March 25, 1943, now Patent No. 2,015,717, and which causes a signal voltage to be developed between terminals 2 and 1 which increases in magnitude with the force of the explosive wave, and of a polarity to make terminal 2 positive with respect to terminal 1.

The signal voltage developed across the variable impedance 154 is applied to the transformer primary 70, resulting in a voltage across secondary 71 of sufficient magnitude to fire tube 73, and anode current flows therein, resulting in voltage drops across the aforementioned biasing networks including resistors 51–66 inclusive and potentiometers 41–50 inclusive. It is contemplated that suitable choice of component values will be made whereby the value of the positive bias voltages will alone not be sufficient to cause any of tubes 31–40 to conduct in the absence of a signal voltage generated by element 154.

The positive signal voltage from source 154 added to the positive bias voltages is sufficient to cause one or more of the tubes 31–40 to conduct, the number of these tubes, from top to bottom, Fig. 1A, depending on the magnitude of the signal voltage. As the tubes of the group 31–40 are fired and become conducting, anode currents flow therein and the electroresponsive devices are energized in the anode circuits of those tubes which fire.

It is contemplated that the neon discharge tube 68 have a predetermined degree of interelectrode capacity whereby this tube does not begin to conduct until after the tubes of the bank 31—40 have been selectively fired. When neon discharge tube 68 conducts, its resistance falls to a low value, thereby effectively short circuiting the voltage divider networks, and rendering the bank of tubes of Fig. 1A unresponsive to later changes in the magnitude of the signal.

Referring now particularly to Fig. 1B, there is shown a second bank of gaseous electron discharge tubes designated 31'–40' inclusive, which are similar to the corresponding tubes of the bank of Fig. 1A, having electroresponsive device 21'–30' inclusive in the respective anode circuits, and biasing networks comprising resistors 51'–66' inclusive and potentiometers 41'–50' inclusive, and also having a gaseous diode 68' connected in series with resistor 67' across the biasing networks similar to Fig. 1A for removing substantially all the potential from the biasing networks when tube 68' is rendered conducting after the tubes 31'–40' are selectively fired in a manner to be subsequently described.

The apparatus of Fig. 1B is connected to the apparatus of Fig. 1A by leads P, Q, R, S, T.

Tube 84, Fig. 1B, may be similar to tube 73, Fig. 1A, tube 84 having cathode 85, control grid 86, and anode 87. Tube 84 has a current control resistor 83 connected to the grid thereof, and a capacitor 81 connected between the other end of the resistor 83 and cathode 84. The junction between resistor 83 and capacitor 81 is connected by way of resistor 82 to terminal 6.

Terminal 6 is connected by a suitable aforementioned lead connection P to terminal 5, Fig. 1A, terminal 5 being connected to cathode 74 of firing control tube 73.

The resistor 82 and capacitor 81, Fig. 1B, comprise an R-C time delay circuit, and the values of these components are preselected to provide a desired time constant, for purposes to be hereafter described in greater detail. The manner of operation of the circuit of Fig. 1B is as follows: The terminals 5 and 6 are normally, when tube 73 is not fired, at the same potential as terminal 2. When tube 73 is rendered conducting in response to a signal voltage of sufficient magnitude applied thereto, the potential of cathode 74 and of terminals 5 and 6, with respect to terminal 2, becomes substantially equal to the potential of battery 152 less the voltage drop in tube 73.

When the potential at terminals 5 and 6 rises to this value, current starts to flow through resistor 82 into capacitor 81. After a time interval determined by the R-C constants of 82 and 81, the voltage across capacitor 81 rises to a value sufficient to fire tube 84, causing biases of progressively decreasing values to be applied simultaneously to the control grids of tubes 31'—40' of Fig. 1B, and a number of these tubes are rendered conducting selectively in accordance with the magnitude of the signal at substantially the moment the bias voltages are applied.

After a brief interval, gaseous or neon tube 68', Fig. 1B, starts to conduct, and the potentials across the biasing networks fall to low values rendering the tubes further unresponsive to changes in the signal voltage.

Referring now to Fig. 1C, a third bank of gaseous electron discharge tubes is provided, comprising tubes 31"—40", which may be similar to the tubes of the other banks, and have similar electroresponsive devices 21"—

30″ associated therewith, and similar biasing networks comprising resistors 51″—66″ and potentiometers 41″–50″ inclusive.

The apparatus of Fig. 1C is connected to the apparatus of Fig. 1B by leads V, Q, R, S, T.

Fig. 1C has a firing control tube 95 which may be a gaseous tube similar to tube 84, and having cathode 96, grid 97, and anode 98, and having an R-C network comprising capacitor 88 and resistor 89 in the grid-cathode circuit thereof, a current limiting resistor 90 in series with the grid, and a grid input terminal 8 connected to resistor 89. A gaseous diode tube 68″ is also provided, connected as shown.

Fig. 1C includes, in addition, a pair of normally nonconducting gaseous electron discharge triodes 107 and 111, having cathodes 110 and 114 respectively, grids 109 and 113 respectively, and anodes 108 and 112 respectively. Cathodes 110 and 114 are connected together and to terminal 9; anodes 108 and 112 are connected by way of resistors 105 and 106 respectively to terminal 10; the grids 109 and 113 are connected in series by way of resistors 103 and 104; the junction between resistors 103 and 104 is connected by way of resistor 101 to cathode 96 of tube 95, and the junction between resistors 103 and 104 is also connected by way of capacitor 102 to cathodes 110 and 114.

Terminals 9 and 10 are connected to terminals 1″ and 3″ respectively. Grid input terminal 8 is connected to terminal 7 of Fig. 1B, which is connected to cathode 85 of tube 84.

The operation of the circuit of Fig. 1C is as follows: Terminal 7 is normally at the same potential as terminal 2″; when tube 84, Fig. 1B, is rendered conducting, terminal 7 assumes a positive potential with respect to terminal 2″. As aforementioned, terminal 7 is connected to terminal 8, and accordingly current begins to flow into capacitor 88. When the voltage on grid 97 rises to a sufficient value, tube 95 is rendered conducting, voltages are applied to the biasing networks and biasing potentials to the grids of tubes 31–40, 31′–40′ and 31″–40″ inclusive, and a number of these tubes are selectively fired in accordance with the magnitude of the signal at substantially the instant the biasing potentials are applied.

After a brief instant, as determined by the capacity of the elements thereof, the neon tube 68″ of Fig. 1C is rendered conductive, and the voltages across the biasing networks fall to a low value, rendering the bank of tubes unresponsive to further changes in the signal voltage.

When cathode 96 assumes a high positive potential as tube 95 is rendered conductive, current starts to flow through resistor 101 into capacitor 102. After a brief interval of time as determined by the R-C constants, the voltage on capacitor 102 assumes a potential sufficient to fire tubes 107 and 111, and these tubes begin to conduct. Since terminals 9 and 10 are connected to terminals 1 and 3 respectively, when tubes 107 and 111 are conducting, a relatively low resistance path is provided shunting battery 151, the path having two parallel branches, one comprising the cathode-anode path of tube 107 in series with resistor 105, and the other the cathode-anode path of tube 111 in series with resistor 106. These paths effectively reduce the anode potential for tubes 31–40, 31′–40′ and 31″–40″ which is developed across terminals 1 and 2, 1′ and 2′, and 1″ and 2″, to a value insufficient to render any of the remaining tubes 31–40, 31′ and 40′ and 31″—40″ conducting under any signal condition. Tubes 107 and 111 therefore, when operated, effectively "cut off" the apparatus.

Whereas the invention has been shown and described with reference to three banks of tubes, it is understood that any number of additional banks comprising circuits similar to that of Fig. 1B, may be added between the circuit of Fig. 1B and that of Fig. 1C which contains the "shut off" circuit. For example, it may be desirable to employ ten banks of tubes, each of the added banks of tubes being wired and connected in a manner similar to that shown in Fig. 1B.

Reference is made now to Fig. 3, in which is shown diagrammatically a typical signal which might be obtained with apparatus comprising ten banks of ten tubes each, and in which the time interval between the operation of each bank and the next succeeding bank is substantially two milliseconds, as determined by the time constants of the R-C networks in the grid circuits of the firing control tubes associated with the respective banks.

The indicating devices 21—30, 21′—30′ and 21″ and 30″ associated with the gaseous measuring tubes 31—40, 31′—40′ and 31″ and 40″ are arranged in parallel rows and files, there being ten devices in each file and ten in each row. In Fig. 3 the devices in each bank which have operated in response to the signal are shown as closed squares, while those which have not been operated are shown as open squares. The characteristics of the signal 160 may then be ascertained by inspection of the devices and by interpolation.

It is noted that the time scale shown in Fig. 3 is the time between the operation of each of the banks of tubes and the next succeeding bank, which may be accurately predetermined by suitable choice of component values of R-C. It is further noted that the signal voltage attains some amplitude before the first (left hand, Fig. 3) bank of indicating devices is selectively operated, this time, for a given choice of component values, being dependent upon the time required for the signal voltage to attain a value in secondary 71 sufficiently to fire tube 73, Fig. 1A, the interelectrode capacity of tube 73 causing a brief delay in the operation of this bank.

Whereas in Figs. 1B and 1C are shown circuits including capacitors 81 and 88 connected to tubes 84 and 97 respectively for providing a time delay for the operation of these tubes, in some instances where it is desired to have the banks operated sequentially at brief intervals, the interelectrode capacities of the tubes may be sufficient to provide the necessary time delay, and the capacitors may accordingly be dispensed with.

Reference is made now to Fig. 2, in which is shown a calibration circuit suitable for use with each of the measuring circuits of Figs. 1A—1C. In the use of this calibrating circuit, the electroresponsive devices 21—30, 21′—30′ and 21″ and 30″ are disconnected from terminals 11—20, 11′—20′ and 11″ and 20″ respectively and from terminals 3, 3′ and 3″ and the circuit of Fig. 2 substituted therefor. The calibrating circuit provides a plurality of resistors 121—130 all connected between terminals 3, 3′ and 3″ and the respective terminals 11—20, 11′—20′ and 11″ and 20″ inclusive. While tubes 31—40, 31′—40′ and 31″—40″ are nonconducting, no potential drops exist across resistors 121—130; but when tubes 31—40, 31′—40′ and 31″—40″ are conducting, current flows through the resistors, causing potential differences thereacross.

Each of the resistors 121—130 has connected thereacross a normally nonconducting neon glow tube 141—150 respectively in series with limiting resistors 131—140 respectively and a common source of potential 158. These neon glow tubes 141—150 are adapted to be fired in response to potential drops across resistors 121—130 respectively, in the manner well known to those skilled in the art.

In utilizing the circuit of Fig. 2 for calibrating, a known voltage is applied across the impedance 154, and the number of tubes of the banks 31—40, 31′—40′ and 31″—40″ which conduct in response to this voltage are noted. Bias voltages may then be adjusted by variable resistors 63, 63′ or 63″ and 66, 61′ or 66″ and potentiometers 41—50, 41′—50′, 41″—50″ inclusive, until the circuit operates in a desired manner.

The circuit of Fig. 2 may also be used alternatively for the corresponding portions of the circuits of Figs. 1A—1C for indicating which of the gaseous electron discharge tubes 31—40, 31'—40' and 31"—40" is fired. In such an application, the lighted tubes 141—150 will have brilliances selectively in accordance with which of the measuring gaseous discharge tubes were rendered conducting.

It is contemplated that any convenient signal source may be employed at 154, Fig. 1A, so long as it provides an unbroken D.-C. path for the grid-cathode circuit of tubes 31—40, 31'—40' and 31"—40". A signal bridge may be employed for this purpose or, if desired, a variable impedance element connected to an external supplementary D.-C. source of energizing potential may be used. In such a case, the supplementary source of potential would be connected in series with a resistor between terminal 1, 1' or 1" and switch 161, and the element 154 should be of the type in which the impedance increases with an increase in pressure applied thereto. If it is desired to employ a signal source having an impedance which decreases with an increase in pressure applied thereto, 154 may be replaced in the circuit by a fixed resistor, and the new signal source connected in series with the supplementary source of potential.

Battery 152, Fig. 1A, is provided with taps, which permit the signal to the recorder to be zero under static pressure conditions, such as are caused by atmospheric or hydrostatic pressures, suitable choice of a tap depending upon the pressure and adjustment of the apparatus, the polarity of battery 152 when switch 161 is not on its zero potential tap opposing the polarity of the signal in the grid-cathode circuit.

The gaseous electron discharge tubes may be, if desired, cold cathode tubes, or tubes having any convenient filament or heater means for heating the cathodes to emission temperatures, and having any convenient source of energizing potential connected to the heater means.

Whereas the invention has been shown and described herein with reference to a preferred embodiment thereof which gives satisfactory results, it will be apparent to those skilled in the art, after understanding the invention, that various changes and modifications may be made without departing from the spirit and scope of the invention, and it is therefore intended in the appended claims to include all such changes and modifications.

This invention may be manufactured and used by or for the Government of the United States of America for governmental purposes without the payment of any royalties thereon or therefor.

What is claimed as new and desired to be secured by Letters Patent of the United States is:

1. Measuring apparatus comprising, in combination, a plurality of interconnected banks of normally inactive electron discharge tubes, pressure responsive variable impedance signal generating means producing a variable signal and connected to said banks of tubes for activating said banks of tubes, space discharge control means connected to said variable impedance signal generating means and to said banks of tubes and responsive to said signal for sequentially rendering said banks conductively susceptible at predetermined spaced time intervals, a variable biasing network connected to said banks of tubes and said signal generating means, visual indicating means connected to said tubes, varying numbers of said indicating means being simultaneously energized in accordance with the magnitude of the signal impressed across said biasing network corresponding to the instantaneous pressure at the instant the circuit is activated.

2. In measuring apparatus of the character disclosed, in combination, a plurality of interconnected normally nonconducting gaseous electron discharge tubes arranged in a plurality of banks, said tubes having a plurality of anode circuits respectively connected thereto, and a variable biasing network connected to each of said banks, a plurality of visual indicating devices connected in said anode circuits respectively and responsive to the respective flows of currents therein, pressure responsive variable impedance means for generating a variable electrical signal, space discharge control means connected to said signal generating means and to said biasing network and responsive to said signal for applying predetermined biasing potentials to said banks, said biasing potentials being graduated by said biasing network, whereby a varying number of said tubes in said banks are rendered simultaneously conductive selectively in accordance with the magnitude of the signal corresponding to variations in pressure.

3. In a pressure measuring apparatus of the character disclosed, in combination, a plurality of interconnected visual indicating devices, said devices being arranged in a plurality of substantially parallel rows and spaced files, pressure responsive means for generating a variable electrical signal, and space discharge means connected to said signal generating means and to all said visual indicating devices and responsive to the signal for consecutively energizing the spaced files of said devices in predetermined time delayed sequence, and a variable biasing network connecting said space discharge means to said visual indicating devices whereby the number of devices in each file which are simultaneously energized is proportional to the instantaneous pressure corresponding to the magnitude of the signal at the instant of energization of the devices.

4. Measuring apparatus comprising, in combination, pressure responsive means for generating a variable electrical signal, and a plurality of interconnected means for indicating the magnitude of the signal at successive time spaced instants in the duration thereof, each of said last named means comprising a bank of gaseous electron discharge tubes connected to said signal generating means, a plurality of variable biasing networks connecting said signal generating means to said discharge tubes, said networks controlling the biasing potentials of the tubes of said banks to permit selectively firing simultaneously any number of said tubes in accordance with the instantaneous pressure corresponding to the magnitude of the signal, and a plurality of visual indicating devices connected to said plurality of gaseous electron discharge tubes respectively and actuated thereby to provide an indication of the number of tubes which fired.

5. In measuring apparatus of the character disclosed, in combination, pressure responsive means for generating a variable electrical signal, a plurality of interconnected normally inactive banks of normally nonconducting gaseous electron discharge tubes, space discharge means for rendering said banks consecutively activated at predetermined time spaced intervals, variable biasing networks connecting said signal generating means to said discharge tubes, said networks controlling the selective firing of each of said banks whereby a varying number of the tubes thereof are simultaneously rendered conducting in accordance with the instaneous magnitude of the signal corresponding to the instantaneous pressure at the instant the bank is activated.

6. Measuring apparatus of the character disclosed comprising, in combination, pressure responsive means for generating a variable electrical signal, a plurality of signal measuring circuits, each of said circuits including a bank of interconnected normally inactive and nonconducting gaseous electron discharge tubes, a plurality of space discharge means connected to said plurality of circuits respectively and to said signal generating means and responsive to the signal for rendering said circuits consecutively activated at predetermined time spaced intervals, each of said circuits including a variable biasing network connecting said tubes and said space discharge means, said gaseous electron discharge tubes of each bank thereof being controlled by said network whereby varying biasing potentials are applied in accordance with the magnitude of the signal corresponding to the instantaneous pressure at the instant the circuit is activated, and visual indicating means in each of said circuits for indicating which of the tubes of the bank thereof are rendered conductive.

7. Measuring apparatus comprising, in combination, pressure responsive means for generating a variable electrical signal, a plurality of interconnected visual indicating means connected to said signal generating means to indicate the magnitude of the signal, variable biasing networks connecting said signal generating means and said visual indicating means, a plurality of interconnected space discharge controlling means connected to said plurality of visual indicating means respectively and to said signal generating means and responsive to the signal for rendering each of said plurality of visual indicating means consecutively operable in predetermined time spaced sequence for a short period during the duration of the signal and thereafter rendering each of said visual indicating means unresponsive to the signal, each of said indicating means comprising apparatus for providing a permanent record of the magnitude of the signal corresponding to the instantaneous pressure at the time the respective indicating means are rendered operable.

8. In measuring apparatus of the character disclosed, in combination, pressure responsive means for generating a variable electrical signal, a plurality of signal indicating circuits, each of said circuits comprising a plurality of interconnected normally nonconducting gaseous electron discharge tubes, each of said tubes having a cathode, control grid, and anode, a plurality of visual indicating means connected to the anodes of said plurality of tubes respectively and energized when said tubes are conducting, a resistance network connected between the cathodes and grids of all tubes, space discharge means connected to said signal generating means and controlled by the signal for applying a voltage to said network, said network providing different graduated bias voltages to all said tubes, said signal indicating circuit being connected to said signal generating means through said resistance network so that when said bias voltages are applied a number of said tubes in each of said circuits are simultaneously conductive corresponding to the magnitude of the signal produced by pressure variations substantially at the moment the bias voltages are applied to the respective indicating circuit.

9. Apparatus according to claim 8 wherein said space discharge means for applying a voltage to said network includes an additional gaseous electron discharge tube for each of said indicating circuits, each of said additional tubes having a cathode, grid, and anode, the cathode and anode of each of said additional tubes having discrete portions of said network and a source of potential connected in series therebetween, the grids of said additional tubes being connected to said signal generating means to render said additional tubes conducting when a signal of predetermined minimum amplitude is applied to their respective grids.

10. In measuring apparatus of the character disclosed, in combination, pressure responsive means for generating a variable electrical signal, a plurality of banks of interconnected normally inoperable visual indicating means, each of said banks of visual indicating means including a plurality of gaseous electron discharge tubes, each of said electron discharge tubes having an anode, cathode, and control grid, a common source of anode potential for the tubes of all said visual indicating means, a plurality of variable biasing control means connected to said plurality of visual indicating means respectively and to said signal generating means and responsive to said signal, said plurality of variable biasing control means rendering said banks of visual indicating means consecutively operable at predetermined time spaced intervals, and space discharge means connected to the last operated bank of the visual indicating means and controlled by the operation thereof for effectively short circuiting said source of anode potential thereby returning all said visual indicating means to a non-activated condition.

11. Measuring apparatus of the character disclosed adapted to measure the characteristics of an electrical signal, comprising, in combination, a pressure responsive signal circuit to which the force to be measured is applied, a plurality of interconnected normally inactive indicating circuits connected to said signal circuit, and a plurality of variable resistance control circuits for said plurality of indicating circuits respectively, all said control circuits being connected in cascade to said signal circuit and energized thereby, said control circuits rendering said indicating circuits active at predetermined time spaced intervals by application of graduated biasing potentials, each of said indicating circuits including visual means to measure the magnitude of the signal corresponding to the instantaneous pressure at substantially the moment the indicating circuit becomes active.

12. Apparatus according to claim 11 wherein each of said control circuits includes a gaseous discharge tube which fires in response to a predetermined signal, said gaseous discharge tube being connected to the associated indicating circuit whereby a closed circuit path through said variable resistance control circuit for activating the indicating circuit is provided.

13. Pressure measuring apparatus comprising a series of interconnected banks of normally nonconducting gaseous electron discharge tubes, each bank of said series including space discharge means and a variable resistance network connected respectively to said discharge tubes, said network when energized providing graduated biasing potentials to said discharge tubes to control the operation thereof, visual indicating means connected to said discharge tubes, constant potential means connected to said interconnected banks in the anodes thereof to provide anode potential to said banks, said first bank of said series including pressure responsive signal generating means to produce a variable electrical signal proportional to the pressure applied thereto, said signal generating means being connected to said space discharge means of each bank in said series, said space discharge means being responsive to a predetermined minimum signal rendering said space discharge means conducting whereby said biasing network is energized to provide variable biasing potentials to activate said discharge tubes at predetermined spaced time intervals, a varying number of said visual indicating devices in each bank indicating the magnitude of the signal corresponding to the instantaneous pressure at the instant said banks are energized.

14. A pressure measuring apparatus as defined in claim 2 including additional space discharge means connected respectively to said biasing network of each bank, said additional space discharge means being activated a predetermined time after activation of said bank whereby said biasing network is short circuited to remove biasing potentials from said respective banks thereby returning said banks to a non-activated condition.

15. A pressure measuring apparatus as in claim 13 wherein the final bank of said series includes additional parallel connected discharge tubes connected to said constant potential means and activated a predetermined time after the last bank of said series has been activated to shunt said constant potential means thereby returning all said banks to a non-activated condition.

16. A pressure measuring apparatus as defined in claim 2 wherein said visual indicating means includes a bank of neon glow tubes in series connection respectively with a plurality of resistance elements and a constant potential source.

17. A pressure measuring apparatus as defined in claim 2 wherein said pressure responsive signal generating means includes an adjustable constant potential source whereby said space discharge means biasing potentials may be adjusted to various minimum responsive values.

References Cited in the file of this patent

UNITED STATES PATENTS

| | | |
|---|---|---|
| 1,759,604 | Bjornson | May 20, 1930 |
| 1,801,657 | Buyko | Apr. 21, 1931 |
| 1,854,640 | Binder et al. | Apr. 19, 1932 |
| 1,918,834 | Crago | July 18, 1933 |
| 2,008,563 | | |
| 2,094,645 | | |
| 2,095,124 | | |
| 2,103,481 | | |
| 2,110,172 | | |
| 2,369,619 | | |
| 2,413,440 | | |
| 2,479,881 | | |
| 2,486,890 | | |
| | Sarbey | July 16, 1935 |
| | Foulke | Oct. 5, 1937 |
| | Cockrell | Oct. 5, 1937 |
| | Mathes | Dec. 28, 1937 |
| | Phinney | Mar. 8, 1938 |
| | Stibitz | Feb. 13, 1945 |
| | Farrington | Dec. 31, 1946 |
| | Wagner | Aug. 23, 1949 |
| | Stanmyre | Nov. 1, 1949 |